United States Patent
Drake et al.

(10) Patent No.: US 6,322,234 B1
(45) Date of Patent: Nov. 27, 2001

(54) OUTDOOR LAMP

(75) Inventors: Michael Drake, Stoney Creek; Brian Spitler, Elon College, both of NC (US)

(73) Assignee: Regent Lighting Corporation, Burlington, NC (US)

(*) Notice: Subject to any disclaimer, the term of this patent is extended or adjusted under 35 U.S.C. 154(b) by 0 days.

(21) Appl. No.: 09/498,391

(22) Filed: Feb. 3, 2000

Related U.S. Application Data

(63) Continuation of application No. 09/054,605, filed on Apr. 3, 1998, now Pat. No. 6,095,665.

(51) Int. Cl.[7] .............................. F21V 14/08; F21V 23/00; F21V 1/10
(52) U.S. Cl. .................. 362/276; 362/802; 362/351; 362/322; 362/282; 250/214 AL
(58) Field of Search ................... 362/276, 802, 362/351, 322, 282, 287; 250/214.1, 214 AL, 215, 214 B, 239

(56) References Cited

U.S. PATENT DOCUMENTS

| | | | |
|---|---|---|---|
| 2,469,581 | * 5/1949 | Slosar | 362/282 |
| 3,638,012 | * 1/1972 | Lenz et al. | 362/276 |
| 4,023,035 | * 5/1977 | Rodriquez | 250/214 AL |
| 5,057,983 | * 10/1991 | Ulrich, Sr. | 362/322 |
| 5,339,226 | * 8/1994 | Ishikawa | 362/282 |
| 5,379,196 | * 1/1995 | Kobayashi et al. | 362/322 |

* cited by examiner

*Primary Examiner*—Thomas M. Sember
(74) *Attorney, Agent, or Firm*—Niro, Scavone, Haller & Niro

(57) ABSTRACT

A lighting system mountable to a support surface that comprises a mounting bracket and a light housing having a lens attached thereto. A bulb is located within the lens and the mounting bracket includes a first support point and a second support point. The housing also has a portion adapted to releasably engage the support points found on the mounting bracket in a sequential manner. In so doing, the first support point is engaged which allows the housing to pivot on the first support point. Next, the second support point is engaged which allows the housing to be secured to the mounting bracket in a fixed relationship.

3 Claims, 3 Drawing Sheets

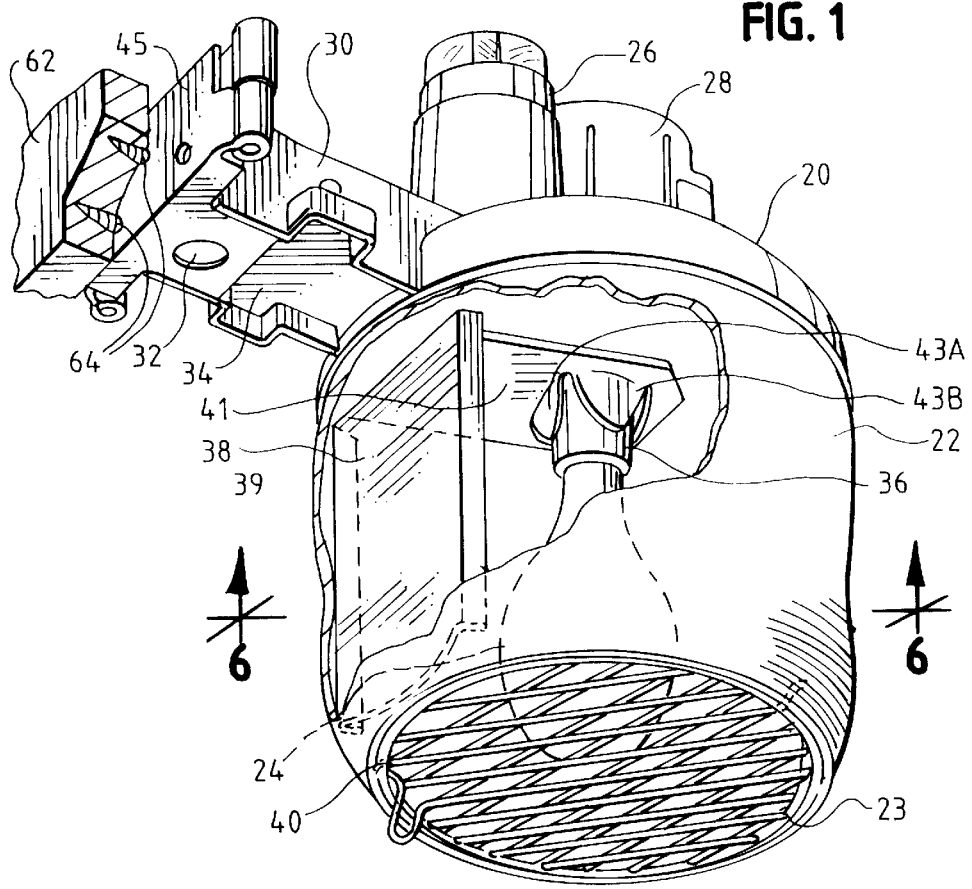
FIG. 1
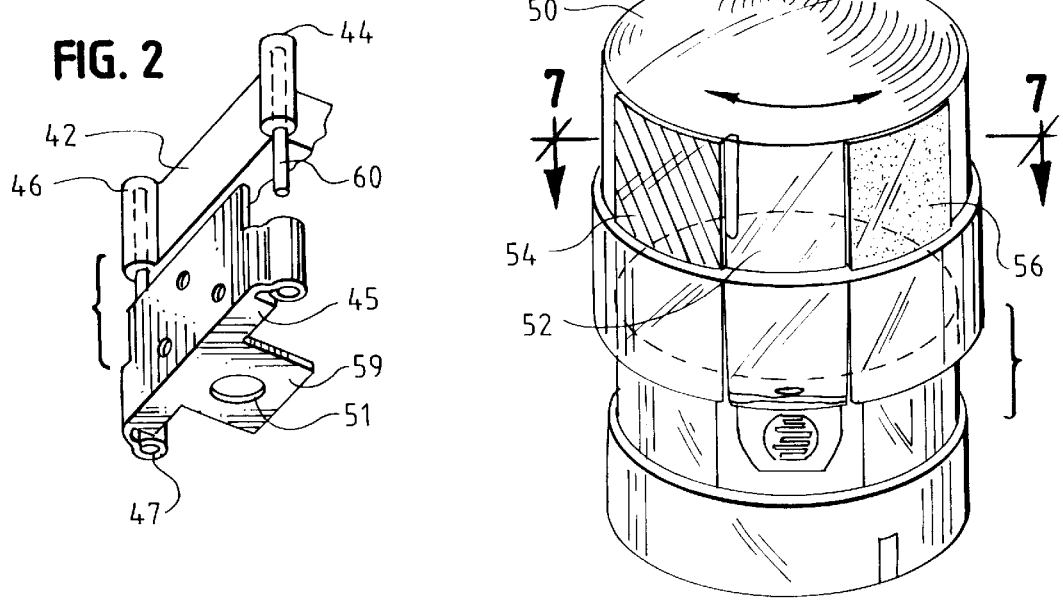
FIG. 2
FIG. 3

OUTDOOR LAMP

CROSS-REFERENCE TO RELATED APPLICATIONS

This application in a continuation of application Ser. No. 09/054,605 filed on Apr. 3, 1998 now U.S. Pat. No. 6,095,665.

BACKGROUND OF THE INVENTION

The invention relates to an improved outdoor light for lighting an outdoor area. More specifically, the present invention uses a rotatable shield that selectively controls the area to be illuminated by the light, an adjustable control that extends the period of operation of the light, and a unique mounting system that makes the light easier to install.

SUMMARY OF THE INVENTION

The outdoor light of the present invention overcomes a number of difficulties associated with outdoor lights. First, as is often the case in residential settings, a homeowner may wish to illuminate a specific area while, at the same time, leave other areas unaffected. This is difficult to do since most outdoor lights emit light in a 360 degree direction. The present invention allows for selective illumination by providing a rotatable shield that controls the area to be illuminated by blocking a portion of the light emitted.

Another problem overcome by the present invention is the difficulty typically associated with wiring and mounting an outdoor light. Most often the only manner in which the light fixtures may be installed is through the use of two people. This is the result of the devices being bulky and heavy as well as from the need to normally install the devices in elevated areas.

The mounting system used on the present invention overcomes these difficulties by providing a bracket to which the light is first pivotally mounted and held in place. Then, the device may be wired and permanently installed.

DESCRIPTION OF THE DRAWINGS

These and other features, objects and advantages of the present invention will become apparent from the following description and drawings wherein like reference numerals represent like elements in the several views, and in which:

FIG. 1 is a perspective view of one embodiment of the invention with portions removed to reveal aspects of the invention.

FIG. 2 is an exploded perspective view of the mounting system of the invention.

FIG. 3 is a perspective view of the light control cover used with the invention.

DESCRIPTION OF THE PREFERRED EMBODIMENT

Figure 4:
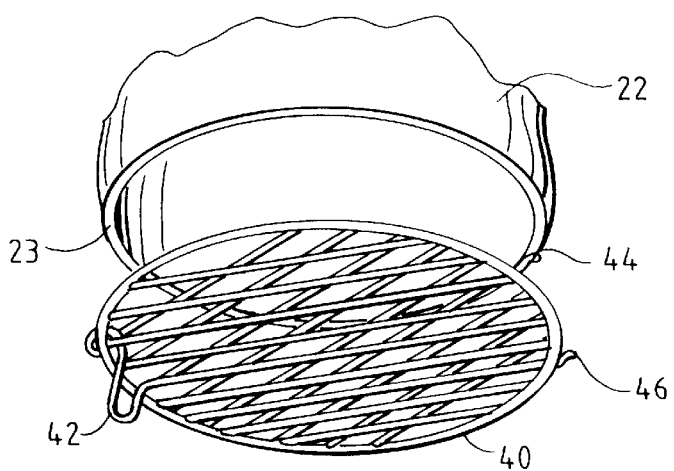
FIG. 4 is an exploded perspective view of a bulb protector used with the invention.

As shown in FIG. 1, a preferred embodiment of the invention consists of a light fixture 20 having a lens 22 made of glass or plastic which has a lower lip 23. Also provide are bulb 24, photo control 26, and a housing 28, which may be made of metal or some other weather resistant material. Housing 28 further includes a throat or channel 30 which defines an interior space 32 that is covered by plate 34.

Figure 6:
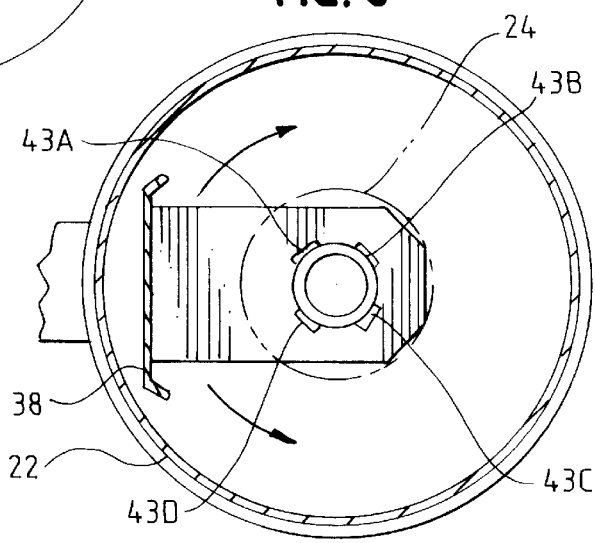
FIG. 6 is an exploded bottom view with portions removed to show the rotatable shield used with the embodiment shown in FIG. 1.

Rotatably mounted to stem 36, which holds bulb 24, is shield 38 which is located within the interior defined by lens 22. As is shown in FIGS. 1 and 6, shield 38 includes a vertical portion 39, a horizontal portion 41 and flanges 43A, 43B, 43C, and 43D which hold shield 38 to stem 36. While shield 38 is rotatably attached to the fixture by flanges 43, persons of ordinary skill in the art would recognize that the shield 38 may be rotatably affixed to the fixture by a number of different methods including fasteners and other co-acting elements.

Figure 5:
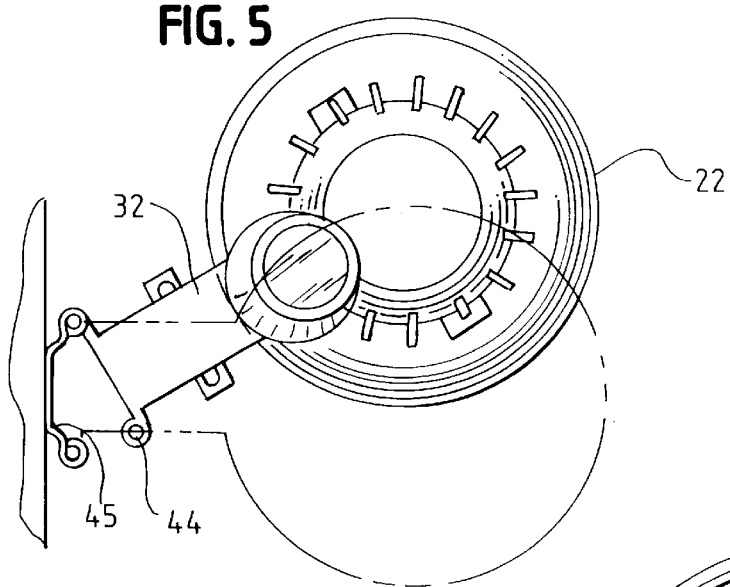
FIG. 5 is a bottom view of the embodiment shown in FIG. 1 showing how the device articulates on a mounting bracket.

As shown in FIG. 2, the distal end of throat 30 includes a plate 42. Opposingly located on plate 42 are apertures 44 and 46. As is also shown in FIGS. 1, 2, 5, and 8, plate 42 is sized to cooperate with bracket 45 to enclose interior space 32. In addition, plate 42 and bracket 45 cooperate to secure fixture 20 to mounting surface 62 by fasteners 64. This is accomplished by the use of an aperture 47 which aligns with aperture 44 of plate 42 and post 49 which aligns with and is sized to fit within aperture 46 of plate 42. As is shown in FIGS. 2 and 5, fixture 20 is first attached to bracket 45 by inserting post 49 into aperture 46.

Figure 7:
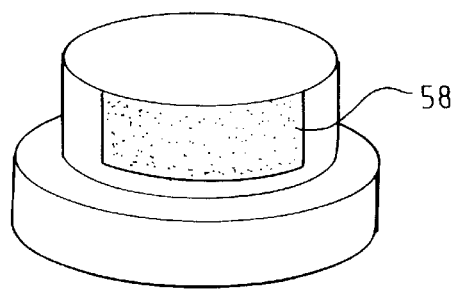
FIG. 7 is a perspective view on an alternate light control cover used with the invention.
Figure 8:
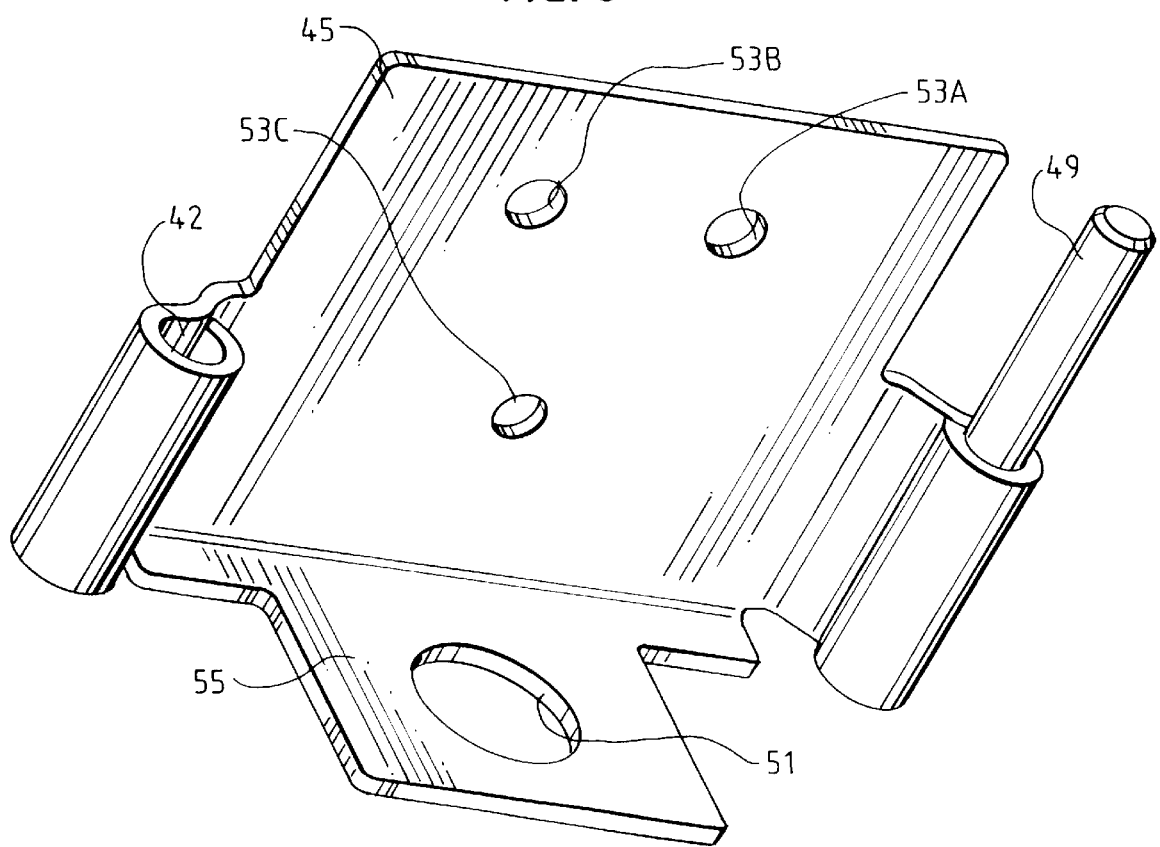
FIG. 8 is an exploded perspective view of the bracket of the mounting system.

FIG. 3 shows photo control cover 50 that is used with the device. As shown in FIGS. 1 and 3, cover 50 is sized to fit over the photo control 26 used on the light. As shown, cover 50 is shaped to fit with a friction fit over control 26 and is adapted to rotate about control 26. Cover 50 may be made of molded plastic. As is shown in FIG. 3, cover 50 includes areas of varying opacity. For example, cover 50 may include clear area 52, an area of diminished opacity 54, and an area of further decreased opacity 56. Alternatively, as shown in FIG. 7, cover 50 may include a gradient of decreasing opacity formed by a dot-matrix which ranges from an almost completely darkened area to a clear area.

To protect bulb 24 from damage a guard 40 covers the interior space defined by lens 22. As shown, guard 40 is made of a wire mesh 41 and has prongs 42, 44, and 46 which engage lip 23 to hold guard 40 in place. Prong 42 is movable so that the guard may be affixed and removed from the device.

In use, bracket 45 is first affixed to a mounting surface 62 by fasteners 64 which are inserted through apertures 53 located on bracket 45. Of course, persons of skill in the art would also appreciate that bracket 45 may be affixed to a mounting surface by other means as well.

Once bracket 45 is installed, fixture 20 is attached, as was described above, by inserting post 49 into aperture 46. This engagement affixes fixture 20 to surface 62 and, as shown in FIG. 5, permits fixture 20 to articulate about an axis defined by post 49.

Permitting fixture 20 to articulate about post 49 permits the fixture to be placed in an open position which allows the end-user to complete the wiring of fixture 20 while the fixture is independently supported. This, in turn, eliminates the need for the person installing the fixture to both support the fixture and complete any necessary wiring at the same time. This may be done by first attaching conduit containing the wiring (not shown) to aperture 51. At this point, the wiring of fixture 20 is connected in interior space 32 and completed. Next, fixture 20 is rotated until aperture 44 and 47 are aligned which puts the device in a closed position so as to permit the insertion of pin 60 into both apertures. This locks the fixture into place, and in addition, seals interior space 32 and the wiring contained therein from the outside elements and tampering.

As may be appreciated, by affixing fixture 20 in this manner, an operator may first secure fixture 20 to mounting surface 62 in an efficient manner with the use of both hands. Then, the wiring may be completed without the need to support the fixture during installation since the device is now securely held. Lastly, the device is locked in place with pin 60 after the wiring is completed.

In use, shield 38 acts to selectively control the areas to be illuminated by the light by being rotatably positionable about bulb 24. For example, once fixture 20 is installed and it is desired to block light from being emitted into a desired area, shield 38 is rotated about bulb 24 until it is in a position to block the light being emitted from the bulb from illuminating the desired area. By having the shield be rotatable about bulb 24, fixture 20 may be placed in almost any position and then the shield may be positioned as desired so as to prevent the illumination of a predetermined area. If no shield is desired, it may simply be removed by sliding it off of stem 36.

To increase the operational time of fixture 20, cover 50 is used. As was described above, cover 50 has areas of decreasing opacity which may be positioned over photo control 26. Placing such an area over the photo control activates bulb 26 for a longer period of time because the cover decreases the amount of light sensed by the photo control. Thus, the greater the amount of decreased opacity used, the longer the period of operation of the fixture.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. An outdoor light comprising:
   a housing having a lens attached thereto and a bulb located in an interior area defined by said lens;
   a shield located between said bulb and said lens, said shield rotatably positionable about said bulb to selectively block light emitted by said bulb; and
   a photo control which is in electrical communication with said bulb, said photo control covered by a cap, said cap having a wall with areas of decreasing opacity wherein said cap permits the time of activation of said bulb to be increased or decreased.

2. The light of claim 1 wherein said housing of said light fixture is adapted to pivotally engage a mounting bracket whereby said light fixture is pivotable between an open position and a closed position with respect to said support bracket.

3. An outdoor light comprising:
   a housing having a lens attached thereto and a bulb located in an interior area defined by said lens;
   a shield located between said bulb and said lens, said shield rotatably positionable about said bulb to selectively block light emitted by said bulb, and said lens has a distal portion which includes an inwardly directed lip which defines an opening, said lip adapted to receive a wire guard which covers said opening.

\* \* \* \* \*